(12) United States Patent
Morishita et al.

(10) Patent No.: US 11,731,480 B2
(45) Date of Patent: Aug. 22, 2023

(54) SUSPENSION SYSTEM AND VEHICLE WITH ADJUSTABLE VEHICLE HEIGHT

(71) Applicant: HONDA MOTOR CO., LTD., Tokyo (JP)

(72) Inventors: Fumihiro Morishita, Tokyo (JP); Masaya Kusatani, Tokyo (JP); Daijiro Endo, Tokyo (JP); Takumi Ozawa, Tokyo (JP); Kuniyoshi Tanaka, Tokyo (JP); Yuki Matsumoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/682,279

(22) Filed: Feb. 28, 2022

(65) Prior Publication Data

US 2022/0314727 A1 Oct. 6, 2022

(30) Foreign Application Priority Data

Mar. 31, 2021 (JP) .................................. 2021-061985

(51) Int. Cl.
*B60G 17/052* (2006.01)
*B60G 17/015* (2006.01)

(52) U.S. Cl.
CPC ..... *B60G 17/0525* (2013.01); *B60G 17/0155* (2013.01); *B60G 2202/152* (2013.01); *B60G 2400/252* (2013.01); *B60G 2500/205* (2013.01); *B60G 2500/302* (2013.01)

(58) Field of Classification Search
CPC ............ B60G 17/0525; B60G 17/0155; B60G 2202/152; B60G 2400/252; B60G 2500/205; B60G 2500/302
See application file for complete search history.

(56) References Cited

U.S. PATENT DOCUMENTS

| 4,911,469 | A | * | 3/1990 | Kawarasaki | ......... | B60G 17/016 |
| | | | | | | 280/DIG. 1 |
| 4,973,079 | A | | 11/1990 | Tsukamoto | | |
| 2019/0176562 | A1 | * | 6/2019 | Ohashi | ............... | B60G 17/0523 |

FOREIGN PATENT DOCUMENTS

| JP | S61155212 U | * | 9/1986 | | |
| JP | 2625824 B2 | * | 7/1997 | ......... | B60G 17/0155 |
| JP | 2625824 B2 | | 7/1997 | | |
| JP | 2017171016 A | * | 9/2017 | ......... | B60G 17/0155 |

* cited by examiner

*Primary Examiner* — Faye M Fleming
(74) *Attorney, Agent, or Firm* — Rankin, Hill & Clark LLP

(57) ABSTRACT

A suspension system (vehicle) includes: an air suspension that is inserted between a vehicle body and each of wheels and that is capable of extending and contracting by means of pressure of working fluid; a compressed air control unit that controls the working fluid; an electric power supplier that supplies electric power to the compressed air control unit; and a power saver that stops flow of the working fluid when abnormality occurs in the electric power supplier. When a vehicle has a predetermined vehicle height, the power saver stops the flow of the working fluid, and when the vehicle has a vehicle height other than the predetermined vehicle height, the power saver allows the working fluid to flow until the vehicle height reaches the predetermined vehicle height, and then stops the flow of the working fluid.

5 Claims, 9 Drawing Sheets

FIG. 6
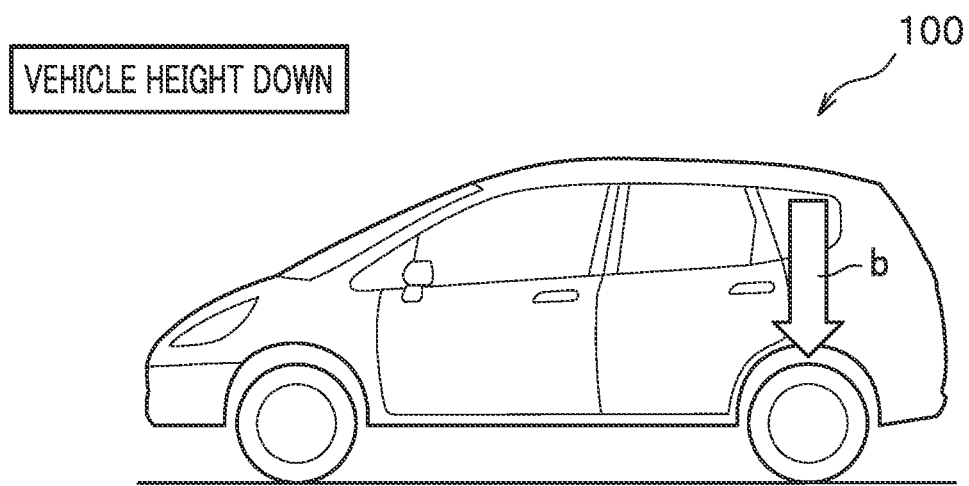
VEHICLE HEIGHT DOWN
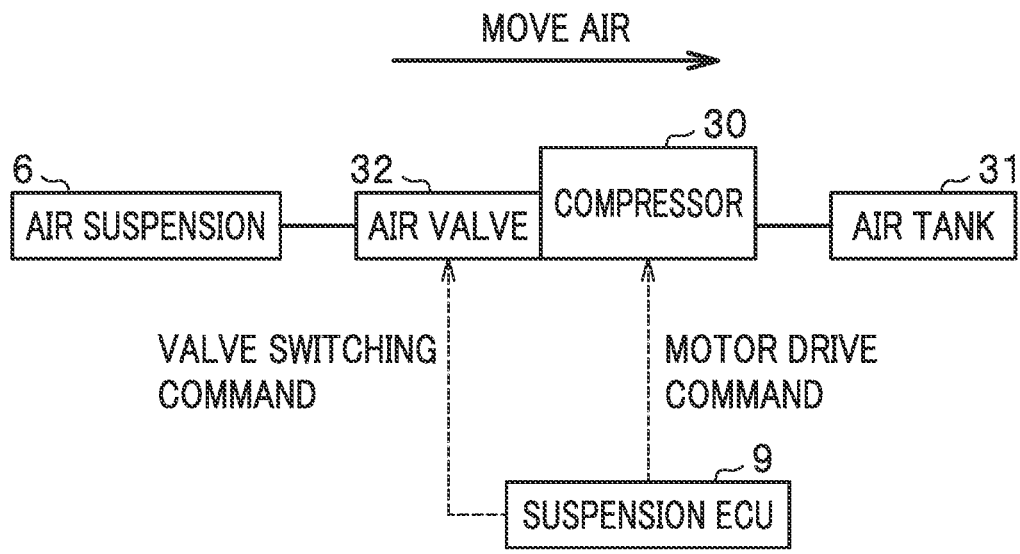

SUSPENSION SYSTEM AND VEHICLE WITH ADJUSTABLE VEHICLE HEIGHT

CROSS-REFERENCE TO RELATED APPLICATION

This application is based upon and claims priority from the Japanese Patent Application No. 2021-061985, filed on Mar. 31, 2021, the entire contents of which are incorporated herein by reference.

BACKGROUND OF THE INVENTION

1. Field of the Invention

The present invention relates to a suspension system and a vehicle with an adjustable vehicle height.

2. Description of the Related Art

A vehicle height adjustment device measures a distance between a road surface and a lower portion of a vehicle body or the like, sets a large target vehicle height, and performs vehicle height adjustment such that an actual vehicle height matches the target vehicle height when the vehicle is traveling, when a driver changes the target vehicle height, when an ignition switch is turned on, or when a door or a trunk is opened.

JP2625824B describes an active suspension that adjusts working fluid pressure of a fluid pressure cylinder to setting pressure set in advance when abnormality is detected in an electrical system that gives a command value to a pressure control valve.

SUMMARY OF THE INVENTION

The active suspension of JP2625824B uniformly changes the working fluid pressure to the setting pressure in the case of abnormality in the electric system. However, when there is some time to spare such as in the case of a decrease in a battery capacity, it is preferable to perform optimal control matching a status of the vehicle.

The present invention has been made in view of such a circumstance and an object is to provide a suspension system and a vehicle with an adjustable vehicle height that can reduce consumption of electric power while securing stability of the vehicle.

A suspension system according to the present invention includes: a suspension that is inserted between a vehicle body and each of wheels and that is capable of extending and contracting by means of pressure of working fluid; a control unit that controls the working fluid; an electric power supplier that supplies electric power to the control unit; and a power saver that stops flow of the working fluid when abnormality occurs in the electric power supplier, in which when a vehicle has a predetermined vehicle height, the power saver stops the flow of the working fluid, and when the vehicle has a vehicle height other than the predetermined vehicle height, the power saver allows the working fluid to flow until the vehicle height reaches the predetermined vehicle height, and then stops the flow of the working fluid.

The present invention can reduce consumption of electric power while securing stability of the vehicle.

BRIEF DESCRIPTION OF THE DRAWINGS

FIG. 6 is a diagram explaining a vehicle height adjustment function in vehicle height DOWN in the suspension system (vehicle) according to the embodiment of the present invention.

DETAILED DESCRIPTION OF THE EMBODIMENTS

Figure 1:
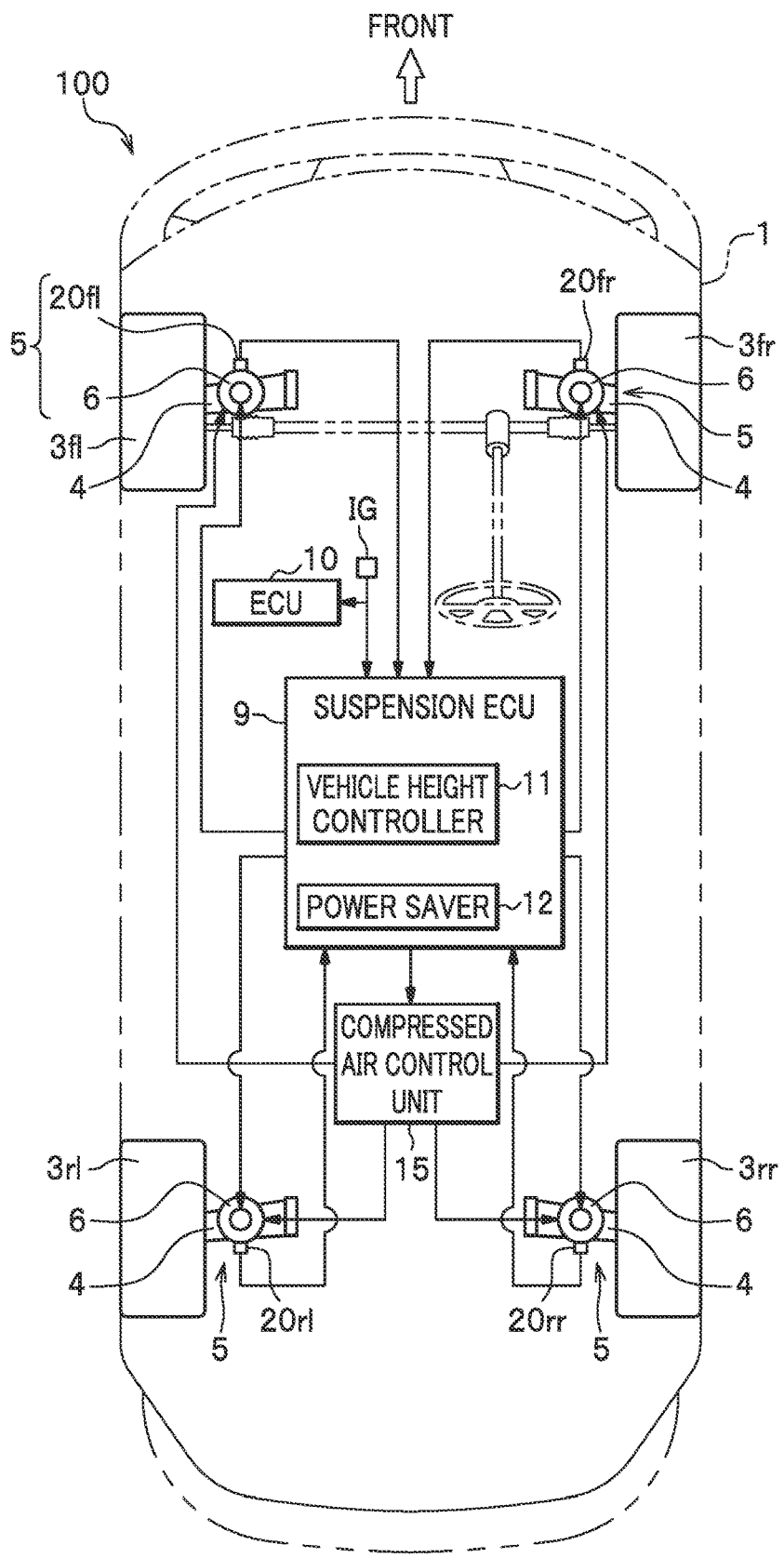
FIG. 1 is a configuration diagram of a suspension system (vehicle) according to an embodiment of the present invention.

An embodiment of the present invention is described in detail with reference to the drawings as appropriate. Note that, in the drawings, the same parts are denoted by the same reference numerals and overlapping description is omitted.

Figure 2:
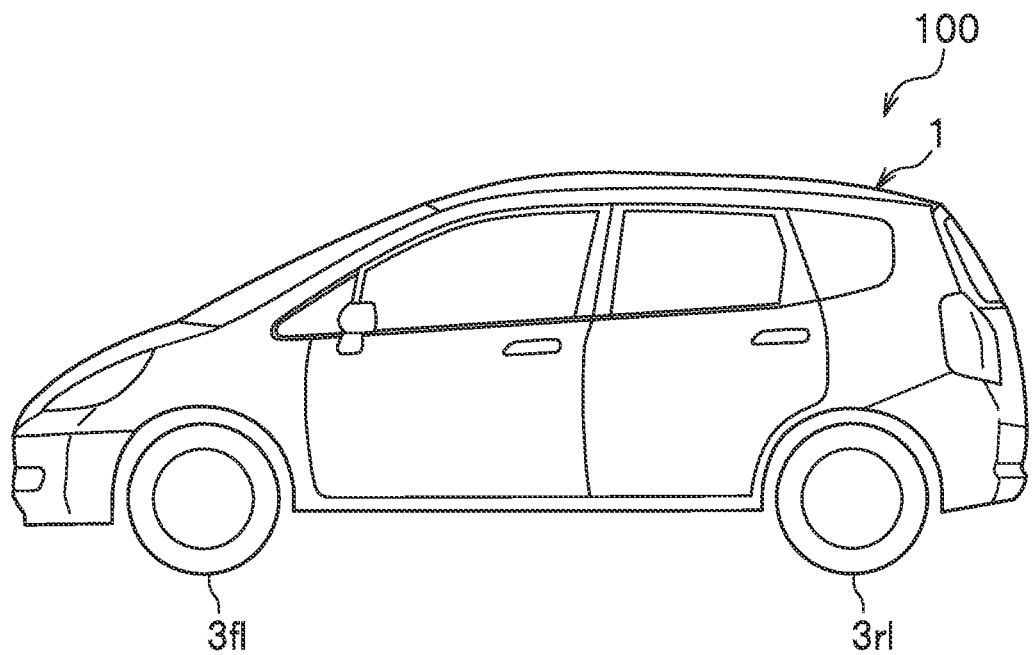
FIG. 2 is a side view of the suspension system (vehicle) according to the embodiment of the present invention.

FIG. 1 is a configuration diagram of a vehicle 100 in which a suspension system according to the embodiment of the present invention is mounted. FIG. 2 is a side view of the vehicle 100. Since the suspension system is incorporated in the vehicle 100 over a wide range and is integrated therewith, the present invention can be considered as the vehicle itself or considered that the suspension system is mounted in the vehicle 100.

The vehicle 100 of the embodiment is a gasoline-powered vehicle but may be a diesel-powered vehicle or an electric vehicle (including a hybrid vehicle and a fuel-cell vehicle).

As shown in FIGS. 1 and 2, four wheels 3 are provided on front, rear, left, and right sides of a vehicle body 1 of the vehicle 100. The wheels 3 include a front left wheel 3*fl*, a rear left wheel 3*rl*, a front right wheel 3*fr*, and a rear right wheel 3*rr*. The wheels 3 are supported on the vehicle body 1 via four suspension arms 4, respectively, and a vehicle height adjustment device 5 is provided between the vehicle body 1 and each of the wheels 3.

Note that, in this specification, when the members arranged to correspond to the four wheels 3*fr*, 3*fl*, 3*rr*, and 3*rl* such as, for example, wheel speed sensors 2*fr*, 2*fl*, 2*rr*, and 2*rl* are to be collectively referred to, numerical portions of reference signs are used. Moreover, in the case of referring to the individual members, the members are identified by using the reference signs including alphabet portions of fr (front right), fl (front left), rr (rear right), and rl (rear left) depending on the arranged positions of the members. Accordingly, when the members are to be collectively referred to, the members are referred as, for example, "wheels 3" and, when the individual members (positions) are to be specified, the members are referred to as, for example, "wheel 3*fr*".

<Vehicle Height Adjustment Device 5>

The vehicle height adjustment device 5 adjusts vehicle heights at positions of the respective wheels 3 in the vehicle body 1.

The vehicle height adjustment device 5 includes air suspensions 6, vehicle height sensors 20 (20*fr*, 20*fl*, 20*rr*, and 20*rl*), and a compressed air control unit 15.

Each of the air suspensions 6 is inserted between the vehicle body 1 and the corresponding wheel 3 and can extend and contract by means of pressure of working fluid (working fluid pressure).

Supplying compressed air (working fluid) to the air suspensions 6 adjusts air pressure in each of the air suspensions 6 and changing the strokes of the vehicle height adjustment device 5 can adjust the vehicle height.

The vehicle height sensors 20 (20*fr*, 20*fl*, 20*rr*, and 20*rl*) are provided in the air suspensions 6 of the four wheels 3*fr*, 3*fl*, 3*rr*, and 3*rl*. The vehicle height sensors 20 can measure the lengths (strokes) of extension and contraction of the vehicle height adjustment device 5. The vehicle height sensors 20 detect the vehicle heights Hfr, Hfl, Hrr, and Hrl at the positions of the wheels 3*fr*, 3*fl*, 3*rr*, and 3*rl* based on relative positional relationships between the wheels 3 and the vehicle body 1. The vehicle heights Hfr, Hfl, Hrr, and Hrl indicate distances from a road surface to a lower end of the vehicle body 1.

Figure 3:
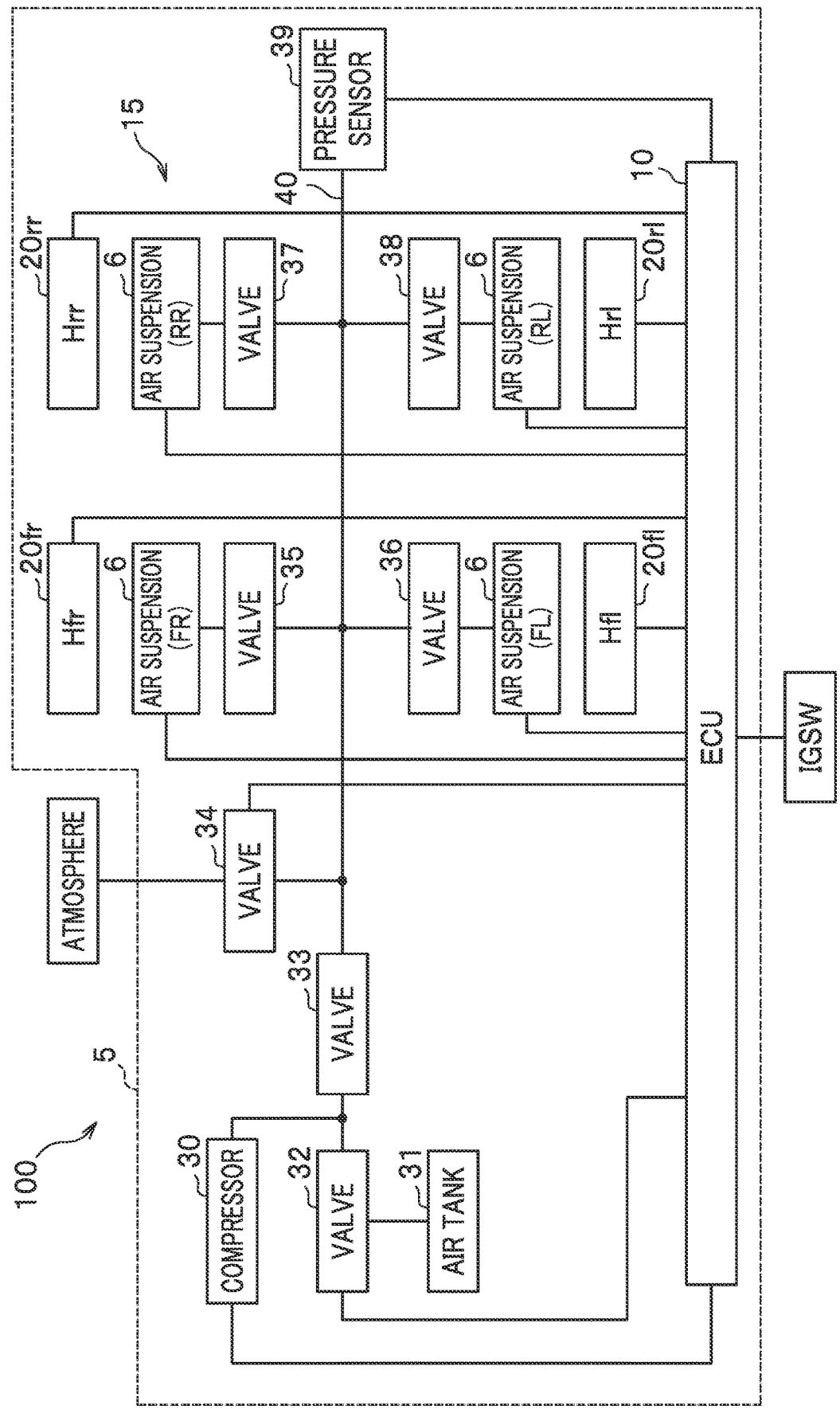
FIG. 3 is a block diagram of the suspension system (vehicle) according to the embodiment of the present invention.

FIG. 3 is a block diagram of the suspension system (vehicle 100).

As shown in FIG. 3, the compressed air control unit 15 includes a compressor 30, an air tank 31, first to seventh valves 32 to 38, and a pressure sensor 39. The compressor 30, the air tank 31, the first to seventh valves 32 to 38, and the pressure sensor 39 are connected to one another by a pipe 40.

The compressed air control unit 15 controls the working fluid to the air suspensions 6 that actively operate by being supplied with the compressed air (working fluid).

The compressed air control unit 15 is activated with an activation of a suspension electronic control unit (ECU) 9 (see FIG. 1) and stops with stop of the suspension ECU 9. The compressed air control unit 15 includes the compressor 30 that generates the compressed air and the first to seventh valves 32 to 38 that supply the generated compressed air to the air suspensions 6 by being opened and that holds the compressed air supplied to the air suspensions 6 by being closed.

The air suspensions 6 are active suspensions that are each inserted between the vehicle body 1 and the corresponding wheel 3 and that can extend and contract by means of the working fluid pressure.

The air suspensions 6 are provided for the respective wheels 3. The air suspensions 6 maintain and adjust the vehicle height by holding air, supplied from the compressor 30 side via the pipe 40, in air chambers (illustration omitted).

The compressor 30 drives a not-shown motor based on a command (motor drive command) (see FIGS. 5 and 6) from the suspension ECU 9 and adjusts the pressure of air in the pipe 40.

The valves 32 to 37 are opened and closed based on a command (valve switching command) (see FIGS. 5 and 6) from the suspension ECU 9. The first valve 32 is arranged on a portion of the pipe 40 connecting the compressor 30 and the air tank 31. The second valve 33 is arranged on a portion of the pipe 40 connecting a set of the compressor 30 and the air tank 31 and a set of the air suspensions 6. The third valve 34 is arranged on a portion of the pipe 40 connecting the atmosphere and the set of air suspensions 6. The fourth to seventh valves 35 to 38 are arranged just before the respective air suspensions 6 and control supply of air from the first to third valves 32 to 34 side to the air suspensions 6.

The pressure sensor 39 detects the pressure P in the pipe 40. In the embodiment, the pressure sensor 39 detects pressure values of the wheels 3*fl*, 3*fr*, 3*rl*, and 3*rr*.

As shown in FIGS. 1 and 2, the vehicle 100 is provided with an electronic control unit 10 (hereinafter, referred to as "ECU 10") that executes various controls of the entire vehicle 100, the suspension ECU 9, a vehicle height controller 11 that executes control of vehicle height adjustment by the vehicle height adjustment device 5, and a power saver 12.

<ECU 10>

The ECU 10, the vehicle height controller 11, the suspension ECU 9, and the compressed air control unit 15 are activated (power thereof is turned on) by turning on (ON) of an ignition switch IG (electric power supplier) and are stopped (power thereof is turned off) by turning off (OFF) of the ignition switch IG. The ECU 10 executes various controls of the entire vehicle 100 from the activation at the turning on (ON) of the ignition switch IG to the stop at the turning off (OFF) of the ignition switch IG.

The ignition switch IG, a not-shown battery, and an electric power supply path of the battery form the electric power supplier that supplies electric power to the compressed air control unit 15.

<Suspension ECU 9>

The suspension ECU 9 controls the active air suspensions 6 according to a command from the ECU 10. The suspension ECU 9 transmits commands to the compressor 30 and the valves 32 to 37 of the compressed air control unit 15 and controls the working fluid supplied to the air suspensions 6. The compressor 30 adjusts the pressure of air in the pipe 40 based on the command (motor drive command) (see FIGS. 5 and 6) from the suspension ECU 9. The valves 32 to 37 are opened and closed based on the valve switching command (see FIGS. 5 and 6) from the suspension ECU 9.

<Vehicle Height Controller 11>

The vehicle height controller 11 executes the control of the vehicle height adjustment by the vehicle height adjustment device 5 from the activation at the turning on (ON) of the ignition switch IG to the stop at the turning off (OFF) of the ignition switch IG.

The vehicle height controller 11 obtains the strokes measured by the vehicle height sensors 20 and can calculate the vehicle height (actual vehicle height) based on the obtained strokes. The vehicle height controller 11 controls the vehicle height adjustment such that the calculated vehicle height becomes a target vehicle height stored in advance in a storage part (illustration omitted).

When the vehicle height is outside a predetermined vehicle height range with a predetermined width in an up-down direction at occurrence of abnormality in the electric power supplier, the vehicle height controller 11 adjusts the vehicle height such that the vehicle 100 (vehicle body 1) has a vehicle height at a boundary of the range.

When the abnormality occurring in the electric power supplier is fixed, the vehicle height controller 11 adjusts the vehicle height such that the vehicle height returns to the target vehicle height before the occurrence of abnormality.

The vehicle height controller 11 controls the vehicle height adjustment device 5 to perform the vehicle height adjustment and the control by the vehicle height controller 11 is performed via the compressed air control unit 15.

Note that the configuration may be such that the ECU 10 includes the vehicle height controller 11 and the entire ECU 10 including the vehicle height controller 11 is activated by receiving a signal from the power saver 12.

<Power Saver 12>

The power saver 12 stops the flow of the working fluid when abnormality occurs in the electric power supplier that supplies electric power to the compressed air control unit 15.

When the vehicle 100 has a predetermined vehicle height, the power saver 12 stops the flow of the working fluid. When the vehicle 100 has a vehicle height other than the predetermined vehicle height, the power saver 12 allows the working fluid to flow until the vehicle height reaches the predetermined vehicle height and then stops the flow of the working fluid.

When the vehicle 100 is leveled, the power saver 12 stops the flow of the working fluid. When the vehicle 100 is not leveled, the power saver 12 allows the vehicle 100 to be leveled and then stops the flow of the working fluid.

The vehicle height adjustment and electric power suppression control of the suspension system (vehicle) are described below.

Figure 4:
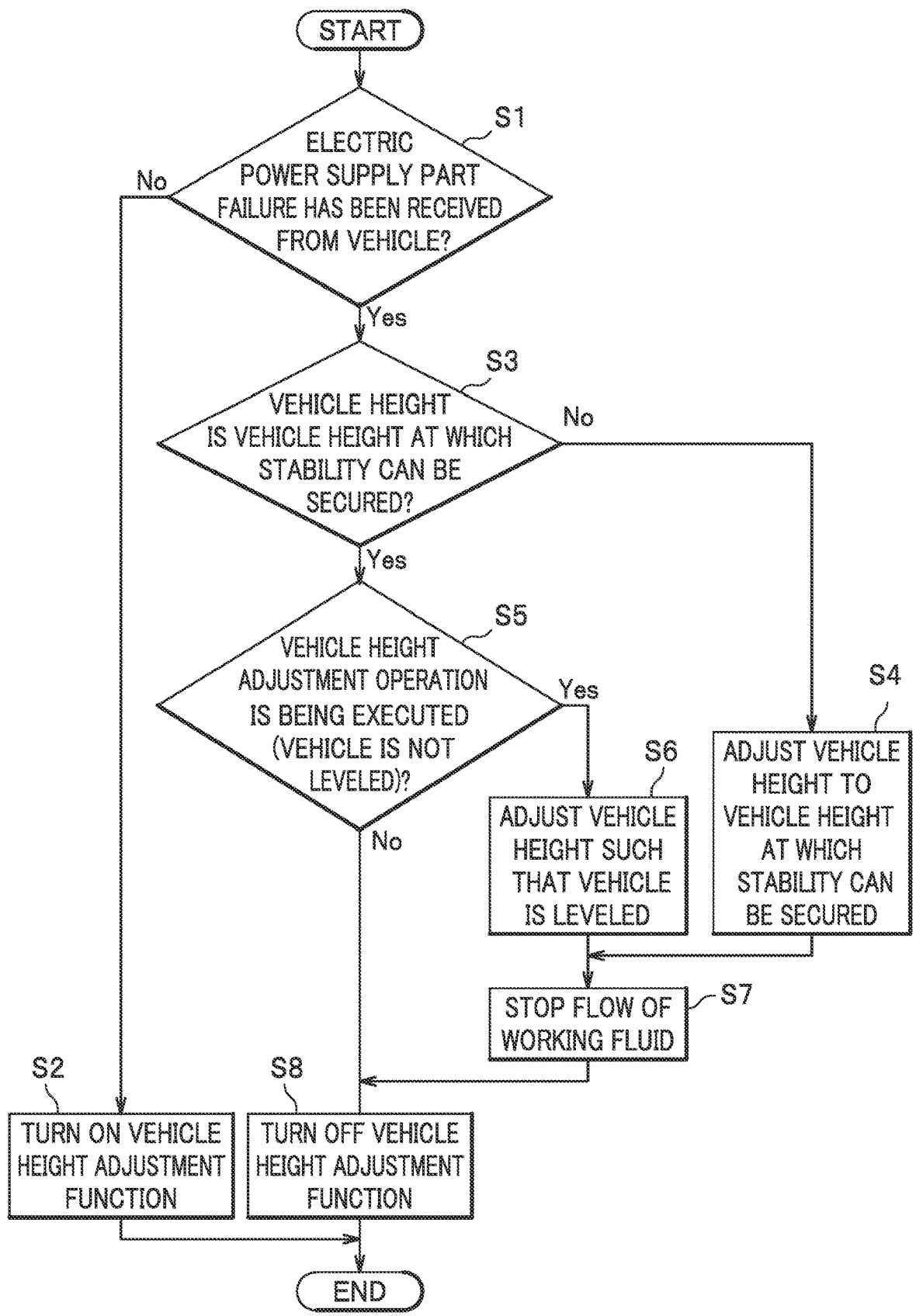
FIG. 4 is a flowchart showing vehicle height adjustment and electric power reduction process of the suspension system (vehicle) according to the embodiment of the present invention.

FIG. 4 is a flowchart showing the vehicle height adjustment and an electric power suppression process of the suspension system (vehicle).

First, in step S1, the power saver 12 determines whether it has received an electric power supply part failure from the vehicle 100.

When the power saver 12 has received no electric power supply part failure from the vehicle 100 (S1: No), in step S2, the vehicle height controller 11 executes control of the vehicle height adjustment by the vehicle height adjustment device 5 by turning on a vehicle height adjustment function, and terminates the process of this flow.

For example, the vehicle height controller 11 executes the control of the vehicle height adjustment by the vehicle height adjustment device 5 by turning on automatic vehicle height adjustment while the vehicle 100 is traveling. The automatic vehicle height adjustment during traveling is changing of a set vehicle height according to a driving mode, and the target vehicle height is changed depending on the selected driving mode. Moreover, the vehicle height is adjusted in conjunction with vehicle speed. For example, when the driving mode is sporty, reducing the height of the center of gravity improves handling characteristics. Moreover, in high-speed traveling, the vehicle height is reduced to improve stability in high-speed traveling. Moreover, hysteresis is provided for the vehicle height change to suppress frequent changing of the vehicle height (increasing and reducing of the vehicle height) in conjunction with the vehicle speed. Furthermore, the vehicle height is reduced stepwise to secure stability.

When the power saver 12 receives the electric power supply part failure from the vehicle 100 in step S1 (S1: Yes), in step S3, the power saver 12 determines whether the vehicle height is a vehicle height at which stability can be secured.

When the vehicle height is not the vehicle height at which stability can be secured (S3: No), in step S4, the power saver 12 causes the vehicle height controller 11 to adjust the vehicle height to the vehicle height at which stability can be secured by using the vehicle height adjustment device 5, and proceeds to step S7.

When the vehicle height is the vehicle height at which stability can be secured (S3: Yes), in step S5, the power saver 12 determines whether a vehicle height adjustment operation is being executed (vehicle is not leveled). When the vehicle height adjustment operation is being executed (vehicle is not leveled), in step S6, the vehicle height controller 11 adjusts the vehicle height such that the vehicle is leveled, and proceeds to step S7.

In step S7, the power saver 12 stops the flow of the working fluid for controlling the extension and contraction of the air suspensions 6 and proceeds to step S8.

When the vehicle height adjustment operation is not being executed in step S5 (S5: No) or when the flow of the working fluid is stopped in step S7, in step S8, the power saver 12 causes the vehicle height controller 11 to turn off the vehicle height adjustment function by the vehicle height adjustment device 5 and terminates the process of this flow.

As described above, when the vehicle 100 does not have the vehicle height at which stability can be secured, the power saver 12 adjusts the vehicle height to the vehicle height at which stability can be secured, and stops the flow of the working fluid (step S3: No to step S4, and to step S7). When the vehicle 100 has the vehicle height at which stability can be secured and which is other than the predetermined vehicle height, the power saver 12 allows the working fluid to flow until the vehicle height reaches the predetermined vehicle height, and then stops the flow of the working fluid (step S3: Yes to step S5, to step S6, and to step S7).

<Vehicle Height Adjustment Function of Air Suspension System>

Figure 5:
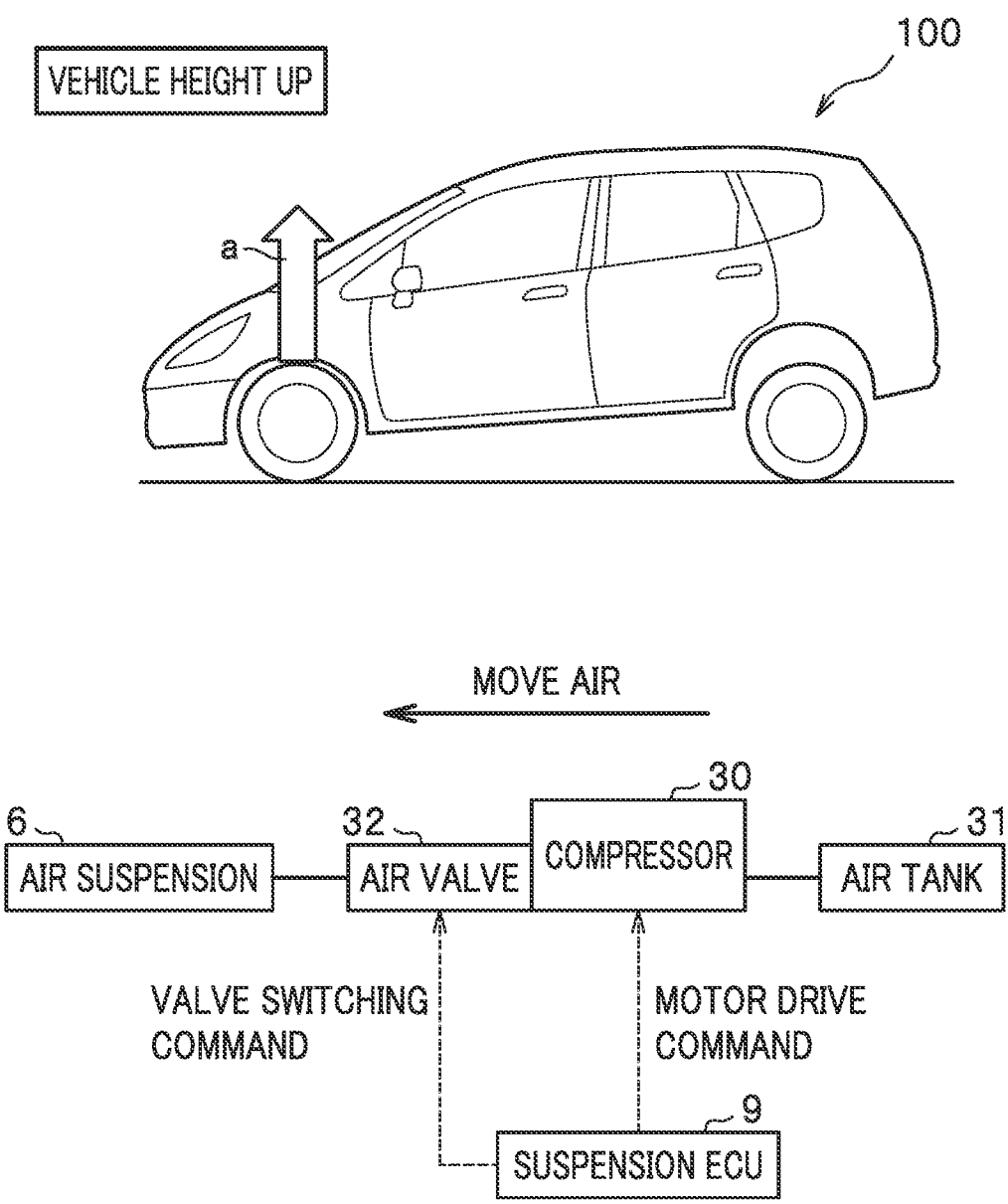
FIG. 5 is a diagram explaining a vehicle height adjustment function in vehicle height UP in the suspension system (vehicle) according to the embodiment of the present invention.

FIGS. 5 and 6 are diagrams explaining the vehicle height adjustment function of the air suspension system (vehicle), FIG. 5 shows the vehicle height adjustment function in vehicle height UP, FIG. 6 shows the vehicle height adjustment function in vehicle height DOWN. Note that the valves are described as air valves in FIGS. 5 and 6.

As shown in FIGS. 5 and 6, the vehicle 100 according to the embodiment performs the vehicle height adjustment by using the compressor 30 to move air between the air suspensions 6 (air springs) shown in FIG. 3 and the air tank 31 or the atmosphere.

The compressor 30 adjusts the pressure of air in the pipe 40 based on the command (motor drive command) from the suspension ECU 9. The valve 32 (same applies to the other valves 33 to 38) is opened and closed based on the valve switching command from the suspension ECU 9.

In vehicle front-side vehicle height UP shown by reference sign a in FIG. 5, the suspension ECU 9 controls the valve 32 and the compressor 30 and moves air from the air tank 31 toward the air suspensions 6 (air springs).

In vehicle rear-side vehicle height DOWN shown by reference sign b in FIG. 6, the suspension ECU 9 controls the valve 32 and the compressor 30 and moves air from the air suspensions 6 (air springs) toward the air tank 31.

In this example, the valve 32 has such a structure that the valve 32 closes a path when the electric power is stopped. Accordingly, the valve 32 does not consume electric power in the state closing the path and electric power consumption in the case where the vehicle height adjustment function is stopped can be reduced. Specifically, since there is no involvement of the compressor 30, drive stop of the compressor 30 (stop of electric power supply to the motor) is possible.

<Operation of Air Suspension System Corresponding to Vehicle State>

Operations of the air suspension system corresponding to vehicle states are described.

The vehicle states include a vehicle state A, a vehicle state B, and a vehicle state A+B that is a combination of the vehicle state A and the vehicle state B.

Vehicle State A: Case Where Vehicle Power Supply Fails When Vehicle Height is Higher Than Certain Reference A system operation is such that the system operates until the vehicle height reaches the vehicle height at which stability can be secured, and is then stopped to reduce consumption of electric power.

Vehicle State B: Case Where Vehicle Power Supply Fails During Vehicle Height Adjustment A system operation is such that the system operates until the vehicle is leveled at the front wheels and the rear wheels, and is then stopped to reduce consumption of electric power.

Vehicle State A+B: Case Where Setting of Target Vehicle Height is Higher Than Certain Reference and Vehicle Height Adjustment is being Executed FIGS. 7A to 7C are diagrams explaining an operation of the air suspension system corresponding to the vehicle state A+B.

Figure 7A:
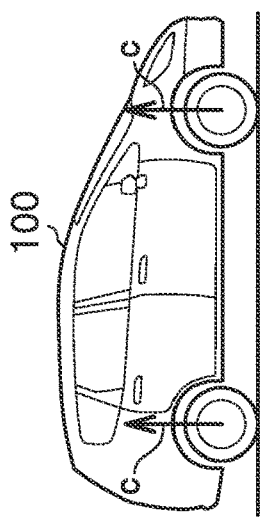
FIGS. 7A to 7C are diagrams explaining an operation of the air suspension system corresponding to a vehicle state in the suspension system (vehicle) according to the embodiment of the present invention.
Figure 7B:
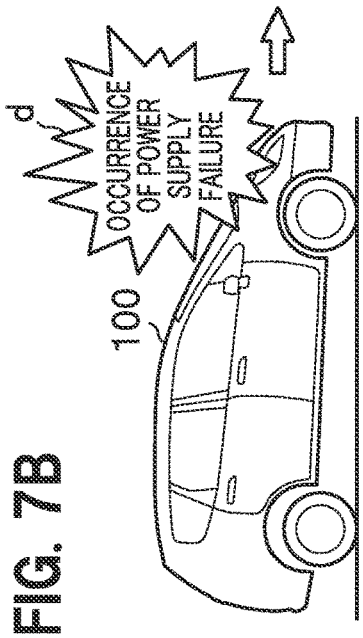
Figure 7C:
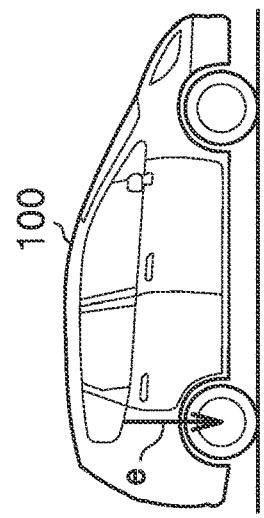

As shown in the left diagram of FIGS. 7A to 7C (FIG. 7A), the user selects the target vehicle height (see the arrow c in FIGS. 7A to 7C) higher than the certain reference for the front and rear sides of the vehicle 100.

Assume that a vehicle power supply failure occurs during the vehicle height adjustment as shown by reference sign d in the middle diagram of FIGS. 7A to 7C (FIG. 7B). FIG. 7B shows that the rear side of the vehicle where there is no failure is raised but the front side cannot be raised due to failure and, accordingly, when the front and rear sides of the vehicle are viewed as a whole, the vehicle is lower on the front side.

The air suspension system receives an electric power limitation notification from the vehicle (see step S1 of the flow in FIG. 4).

As shown in the right diagram of FIGS. 7A to 7C (FIG. 7C), the system determines the vehicle state and executes the vehicle height adjustment (see the arrow e in FIGS. 7A to 7C) such that the vehicle height is lowered to the vehicle height at which stability can be secured and the vehicle is leveled (see step S4 of the flow in FIG. 4). FIG. 7C shows that the front side of the vehicle is lower (or the raising of the front side cannot be performed) due to failure in FIG. 7B and the rear side is thus lowered to level the vehicle.

Figure 8:
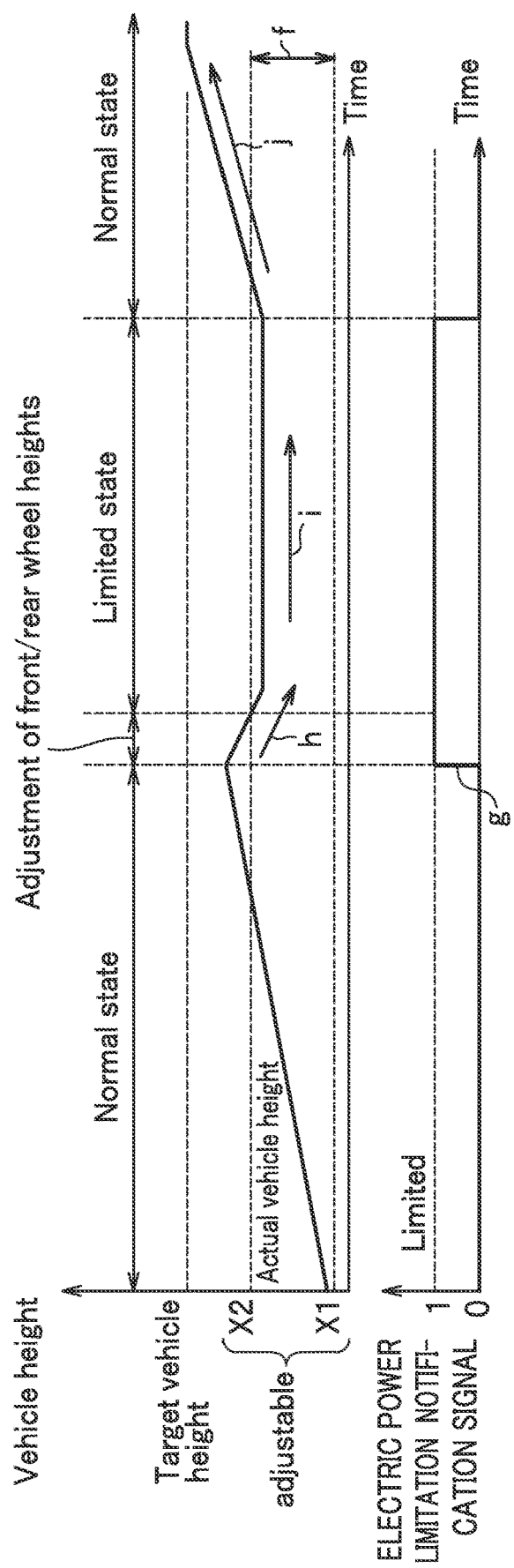
FIG. 8 is a timing chart of an operation of the suspension system corresponding to the vehicle state of FIGS. 7A to 7C.

FIG. 8 is a timing chart of the operation of the air suspension system corresponding to the vehicle state A+B of FIGS. 7A to 7C. The vertical axis represents the electric power limitation notification signal and the Vehicle height and the horizontal axis represents time.

In the Vehicle height of the vertical axis, there are adjustable (adjustable range of the vehicle height) having an upper limit of X2 and a lower limit of X1 (where X2>X1) and Target vehicle height. Moreover, in the electric power limitation notification signal of the vertical axis, there is Limited (limitation signal present "1") (in this case, "failure detection signal" present "1"). The range between the upper limit X2 and the lower limit X1 of the adjustable is a range of the vehicle height in which stability can be secured (see the arrow fin FIG. 8).

Normal state in the horizontal axis is a normal state, Limited state is a failure limited operation state, and Adjustment of front/rear wheel heights is a vehicle height adjustment height state in transition from the Normal state to the Limited state.

In the aforementioned timing chart, Actual vehicle height is the target vehicle height in traveling. The vehicle 100 receives failure occurrence determination (see the arrow g in FIG. 8) and transitions from the Normal state before the occurrence of the failure to the Adjustment of front/rear wheel heights and the air suspension system executes vehicle height DOWN (see the arrow h in FIG. 8). In FIGS. 7A to 7C, since there is a failure on the front side, the air suspension system executes vehicle height DOWN of lowering the rear side.

Thereafter, in the Limited state, the air suspension system adjusts the vehicle height such that the vehicle is leveled (see reference sign i in FIG. 8), and then completely stops the flow of the working fluid (see steps S6 and S7 of the flow in FIG. 4).

The air suspension system receives the Limited (limitation signal absent "0") of the electric power limitation notification signal and returns to the Normal state. After the recovery of electric power, the air suspension system resumes the system operation and moves the vehicle height to the target value (see reference sign j in FIG. 8) (see step S2 of the flow in FIG. 4).

As described above, the suspension system (vehicle 100) executes the system operation corresponding to the vehicle state and then suppresses electric power.

<Range of Vehicle Height>

The range of the vehicle height is described.

In the suspension system (vehicle 100), when the vehicle 100 has the predetermined vehicle height, the power saver 12 stops the flow of the working fluid. When the vehicle 100 has a vehicle height other than the predetermined vehicle height, the power saver 12 allows the working fluid to flow until the vehicle height reaches the predetermined vehicle height, and then stops the flow of the working fluid. The predetermined vehicle height is a range with a predetermined width in the up-down direction and the vehicle height controller 11 adjusts the vehicle height to a boundary of the range when the vehicle height is outside the range at occurrence of abnormality in the electric power supplier.

Figure 9:
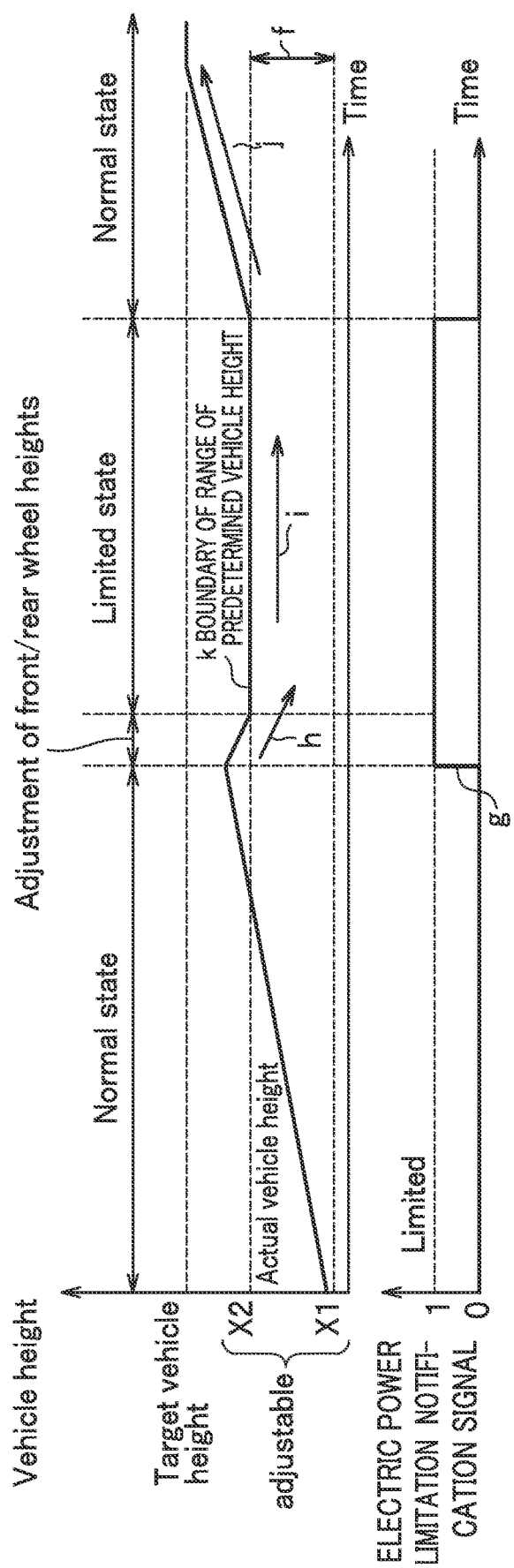
FIG. 9 is a timing chart for explaining a range of the vehicle height in the suspension system (vehicle) corresponding to the vehicle state of FIGS. 7A to 7C.

FIG. 9 is a timing chart for explaining the range of the vehicle height of the suspension system (vehicle). The same parts as those in FIG. 8 are denoted by the same reference signs.

The range between the upper limit X2 and the lower limit X1 of the Adjustable in FIG. 9 is the range of the vehicle height in which stability can be secured (see the arrow fin FIG. 9). The predetermined vehicle height described above is a vehicle height in the range of the vehicle height (see the arrow fin FIG. 9).

As shown in FIG. 9, the vehicle height controller 11 adjusts the vehicle height to a boundary (upper limit) of this range of the vehicle height (see the arrow f in FIG. 9) in the Actual vehicle height. Specifically, when the vehicle height is outside the range at occurrence of abnormality in the electric power supplier, the vehicle height controller 11 adjusts the vehicle height such that the vehicle 100 (vehicle body 1) has a vehicle height at a boundary of the range (see reference sign k in FIG. 9) of the predetermined vehicle height with the predetermined width in the up-down direction.

Moreover, when the abnormality occurring in the electric power supplier is fixed, the vehicle height controller 11 adjusts the vehicle height such that the vehicle height returns to the target vehicle height before the occurrence of abnormality as shown by reference sign j in FIG. 9.

As described above, the suspension system (vehicle 100) (see FIG. 1) of the embodiment includes the air suspension 6 that is inserted between the vehicle body 1 and each wheel 3 and that can extend and contract by means of the working fluid pressure, the compressed air control unit 15 that controls the working fluid, the electric power supplier that supplies electric power to the compressed air control unit 15, and the power saver 12 that stops the flow of the working fluid when abnormality occurs in the electric power supplier. When the vehicle 100 has the predetermined vehicle height, the power saver 12 stops the flow of the working fluid. When the vehicle 100 has a vehicle height other than the predetermined vehicle height, the power saver 12 allows the working fluid to flow until the vehicle height reaches the predetermined vehicle height, and then stops the flow of the working fluid.

In this configuration, the suspension system operates until the vehicle height reaches the vehicle height at which stability can be secured and then stops the flow of the working fluid. Accordingly, it is possible to secure stability of the vehicle while reducing consumption of electric power.

In the suspension system (vehicle 100), when the vehicle 100 is leveled, the power saver 12 stops the flow of the working fluid and, when the vehicle 100 is not leveled, the power saver 12 allows the vehicle 100 to be leveled and then stops the flow of the working fluid.

The suspension system thereby operates until the vehicle height reaches the vehicle height at which stability can be secured, and then stops the flow of the working fluid. Accordingly, it is possible to secure stability of the vehicle while reducing consumption of electric power.

The suspension system (vehicle 100) includes the air tank 31 that supplies the working fluid to the air suspensions 6 and the valve 32 that opens and closes the path between the air tank 31 and the corresponding air suspension 6, and the valve 32 closes the path when the electric power stops.

The suspension system thereby does not consume electric power in the state where the path is closed. Accordingly, it is possible to reduce consumption of electric power when the vehicle height adjustment function is stopped.

Moreover, since the suspension system (vehicle 100) stops the operation of the compressor 30 simultaneously with power saving by stopping of the operation of the valve that closes in power supply OFF, the suspension system can achieve further power saving.

The suspension system (vehicle 100) includes the vehicle height adjustment device 5 that adjusts the vehicle height at the position of each wheel 3 in the vehicle body 1 and the vehicle height controller 11 that controls the vehicle height adjustment by the vehicle height adjustment device 5. The predetermined vehicle height is the range with the predetermined width in the up-down direction. When the vehicle height is outside the range at occurrence of abnormality in the electric power supplier, the vehicle height controller 11 adjusts the vehicle height to a boundary of the range.

The suspension system thereby performs control with the vehicle height at which the stability can be secured handled as the range, and this can reduce unnecessary vehicle height adjustment. Moreover, when the vehicle height is outside the range, the suspension system adjusts the vehicle height to the boundary close to the vehicle height. The suspension system thereby only has to perform minimum vehicle height adjustment and electric power consumption can be reduced.

In the suspension system (vehicle 100), when the abnormality occurring in the electric power supplier is fixed, the vehicle height controller 11 adjusts the vehicle height such that the vehicle height returns to the target vehicle height before the occurrence of abnormality.

The vehicle height can thereby return to the original vehicle height when the abnormality is fixed. Moreover, since the vehicle height is adjusted to the boundary, the vehicle height can return to the original vehicle height more quickly.

The aforementioned embodiment is described in detail to explain the present invention in an easily understandable manner. The present invention is not necessarily limited to an embodiment including all configurations described above.

What is claimed is:

1. A suspension system comprising:
   a suspension that is inserted between a vehicle body and each of the wheels of a vehicle and that is capable of extending and contracting by means of pressure of working fluid;
   a control unit that controls the working fluid;
   an electric power supplier that supplies electric power to the control unit;
   a power saver that stops flow of the working fluid when abnormality occurs in the electric power supplier;
   a vehicle height adjustment device that adjusts a vehicle height at a position of each of the wheels in the vehicle body; and
   a vehicle height controller that controls vehicle height adjustment by the vehicle height adjustment device, wherein
   a predetermined vehicle height is a range with a predetermined width in an up-down direction,
   when the vehicle height is higher than a highest height of the range when the abnormality in the electric power supplier occurs, the vehicle height controller adjusts the vehicle height to the highest height of the range, and then the power saver stops the flow of the working fluid, and
   when the vehicle height is lower than a lowest height of the range when the abnormality in the electric power supplier occurs, the vehicle height controller adjusts the vehicle height to the lowest height in the range, and then the power saver stops the flow of the working fluid.

2. The suspension system according to claim 1, wherein when the vehicle is leveled, the power saver stops the flow of the working fluid, and
   when the vehicle is not leveled, the power saver allows the vehicle to be leveled and then stops the flow of the working fluid.

3. The suspension system according to claim 1, further comprising:
   a tank that supplies the working fluid to the suspension, and
   a valve that opens and closes a path between the tank and the suspension, wherein
   the valve closes the path when the electric power stops.

4. The suspension system according to claim 1, wherein, when the abnormality occurring in the electric power supplier is fixed, the vehicle height controller adjusts the vehicle height such that the vehicle height returns to a target vehicle height before occurrence of the abnormality.

5. A vehicle with an adjustable vehicle height, comprising:
   a suspension that is inserted between a vehicle body and each of the wheels of the vehicle and that is capable of extending and contracting by means of pressure of working fluid;
   a control unit that controls the working fluid;
   an electric power supplier that supplies electric power to the control unit;
   a power saver that stops flow of the working fluid when abnormality occurs in the electric power supplier;
   a vehicle height adjustment device that adjusts the vehicle height at a position of each of the wheels in the vehicle body; and a vehicle height controller that controls vehicle height adjustment by the vehicle height adjustment device, wherein a predetermined vehicle height is a range with a predetermined width in an up-down direction, when the vehicle height is higher than a highest height of the range when the abnormality in the electric power supplier occurs, the vehicle height controller adjusts the vehicle height to the highest height of the range, and then the power saver stops the flow of the working fluid, and when the vehicle height is lower than a lowest height of the range when the abnormality in the electric power supplier occurs, the vehicle height controller adjusts the vehicle height to the lowest height in the range, and then the power saver stops the flow of the working fluid.

\* \* \* \* \*